(12) United States Patent
Wiedenhoefer et al.

(10) Patent No.: US 7,828,546 B2
(45) Date of Patent: Nov. 9, 2010

(54) NATURALLY ASPIRATED FLUIDIC CONTROL FOR DIVERTING STRONG PRESSURE WAVES

(75) Inventors: James Fredric Wiedenhoefer, Glenville, NY (US); Adam Rasheed, Glenville, NY (US); Anthony John Dean, Scotia, NY (US); Pierre Francois Pinard, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 719 days.

(21) Appl. No.: 11/172,304

(22) Filed: Jun. 30, 2005

(65) Prior Publication Data

US 2007/0015099 A1 Jan. 18, 2007

(51) Int. Cl.
*F23D 14/82* (2006.01)
(52) U.S. Cl. .......................... 431/346; 431/354; 60/200; 60/207; 60/247; 60/315; 60/776; 48/192
(58) Field of Classification Search .................. 431/346, 431/354; 60/207, 776, 39.11, 315, 226.1, 60/749, 723, 737, 753, 200, 247; 48/192
See application file for complete search history.

(56) References Cited

U.S. PATENT DOCUMENTS

| | | | | |
|---|---|---|---|---|
| 2,551,115 A | * | 5/1951 | Goddard | 60/39.11 |
| 4,790,744 A | * | 12/1988 | Bellet et al. | 431/75 |
| 5,070,690 A | * | 12/1991 | Mayer | 60/762 |
| 5,113,649 A | * | 5/1992 | Siedlecki, Jr. | 60/226.3 |
| 5,718,573 A | * | 2/1998 | Knight et al. | 431/354 |
| 5,873,240 A | * | 2/1999 | Bussing et al. | 60/207 |
| 5,964,086 A | * | 10/1999 | Kraemer | 60/776 |
| 6,484,492 B2 | | 11/2002 | Meholic et al. | |
| 6,699,035 B2 | * | 3/2004 | Brooker | 431/346 |
| 2004/0025495 A1 | * | 2/2004 | Dev | 60/226.1 |
| 2006/0075745 A1 | * | 4/2006 | Cummings | 60/315 |

\* cited by examiner

*Primary Examiner*—Steven B McAllister
*Assistant Examiner*—Avinash Savani
(74) *Attorney, Agent, or Firm*—Francis T. Coppa

(57) ABSTRACT

A pulse detonation device for dividing a pulse detonation shock wave into an primary and control portion to reduce the strength of a propagating shock wave and/or change its direction. The device contains a flow separator which directs a portion of the shock wave into itself, thus reducing the shock wave's strength. In one configuration, the control region converges in cross-sectional area so as to accelerate the flow in the control region, while the primary region diverges to slow the flow in the primary region. The flow in the control region is directed, at an angle, into the flow of the primary region to impede and/or redirect the flow of the primary region.

36 Claims, 3 Drawing Sheets

NATURALLY ASPIRATED FLUIDIC CONTROL FOR DIVERTING STRONG PRESSURE WAVES

BACKGROUND OF THE INVENTION

This invention relates to a passive apparatus which lessens the intensity of a back propagating pressure wave while having negligible impact on forward pressure loss.

In existing pulse detonation devices a shock wave is produced as a result of each detonation. This shock wave propagates both downstream, producing thrust, and upstream toward the inlet of the device. The upstream propagation of these shock waves can have detrimental effects to the operation of a pulse detonation device. Specifically, in a valveless system, shock waves can enter the flow inlets, which feed air and/or fuel into the device, thus causing high pressure spikes in this structure, which can damage internal components or otherwise impede optimal operation.

Several methods have been considered to prevent the propagation of strong pressure waves including mechanically valved systems. However, such systems require a number of moving parts, which increases the cost and complexity of such systems. Additionally, the presence of a valve system reduces the operational reliability of the detonation device.

Thus, a system or configuration that can be used in pulse detonation (and similar) devices, which require no additional moving parts or complex systems, and reduce the backflow of strong pressure waves, is desirable.

SUMMARY OF THE INVENTION

In an embodiment of the present invention, the detonation chamber of a pulse detonation device is made up of a control region and a primary region. The upstream propagating pressure wave is split into these two regions. The control region is configured and structured such that the portion of the pressure wave entering the control region is accelerated ahead of the pressure wave propagating through the primary region. Further, the portion of the pressure wave passing through the control region is redirected and channeled so as to form a high speed flow which is directed into the backflow passing through the primary region. The mixing of these two flows impedes the progress of the backflow passing through the primary portion and redirects the flow, thus hindering the propagation of the pressure wave further upstream. By preventing the pressure wave from moving upstream within the device, reducing its size or magnitude and redirecting the flow, the operational integrity and life of the system is increased. Furthermore, this type of passive valving increases the net thrust of the pulse detonation device.

As used herein, a "pulse detonation chamber" (or "PD" chamber) is understood to mean any combustion device or system where a series of repeating detonations or quasi-detonations within the device cause a pressure rise and subsequent acceleration of the combustion products as compared to the pre-burned reactants. A "quasi-detonation" is a combustion process that produces a pressure rise and velocity increase higher than the pressure rise produced by a deflagration wave. Typical embodiments of PD chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the PD chamber exhaust to produce a thrust force. As known to those skilled in the art, pulse detonation may be accomplished in a number of types of detonation chambers, including detonation tubes, shock tubes, resonating detonation cavities and annular detonation chambers.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
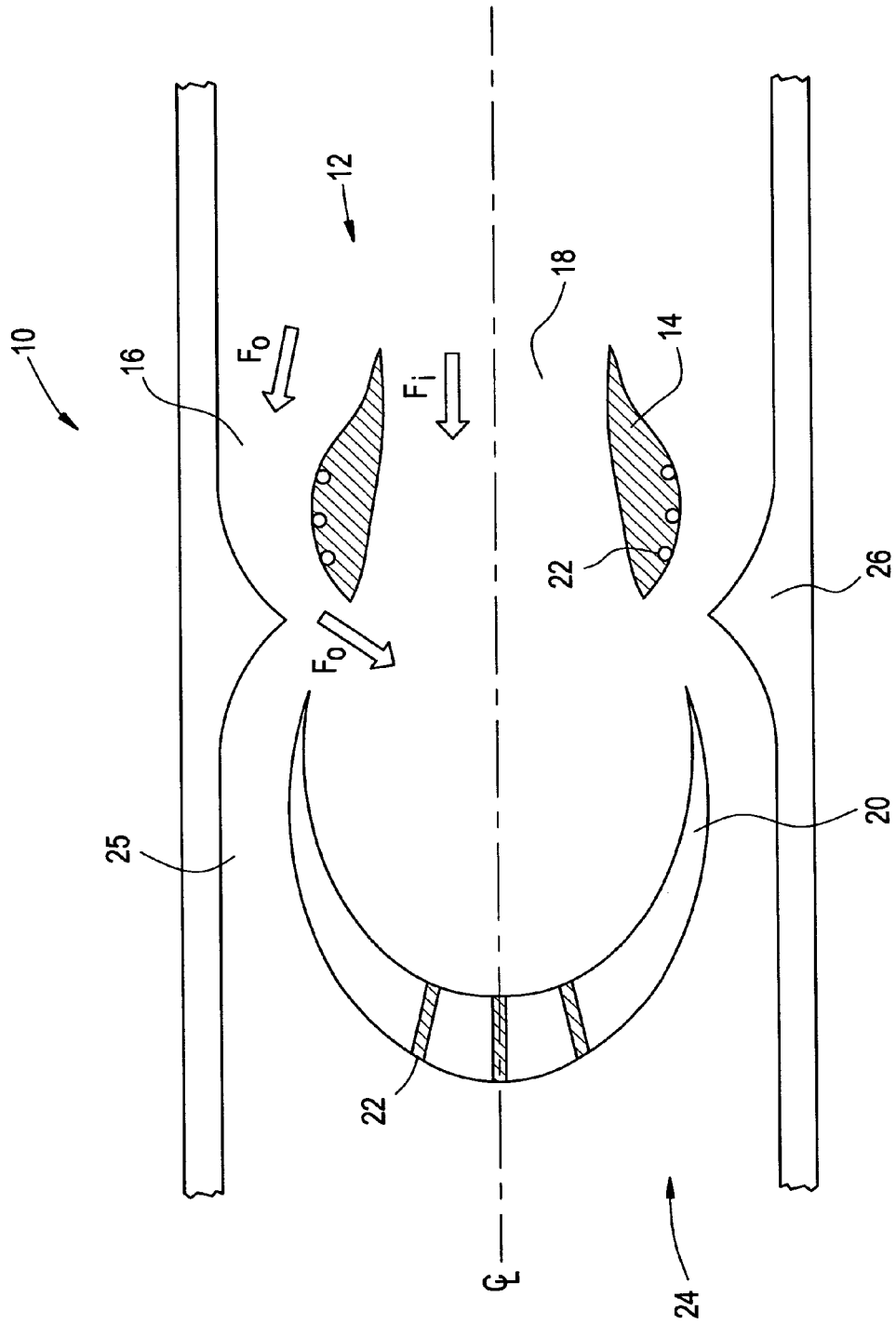
FIG. 1 is a diagrammatical representation of a naturally aspirated flow control device for redirecting strong pressure waves in accordance with an exemplary embodiment of the present invention.
Figure 2:
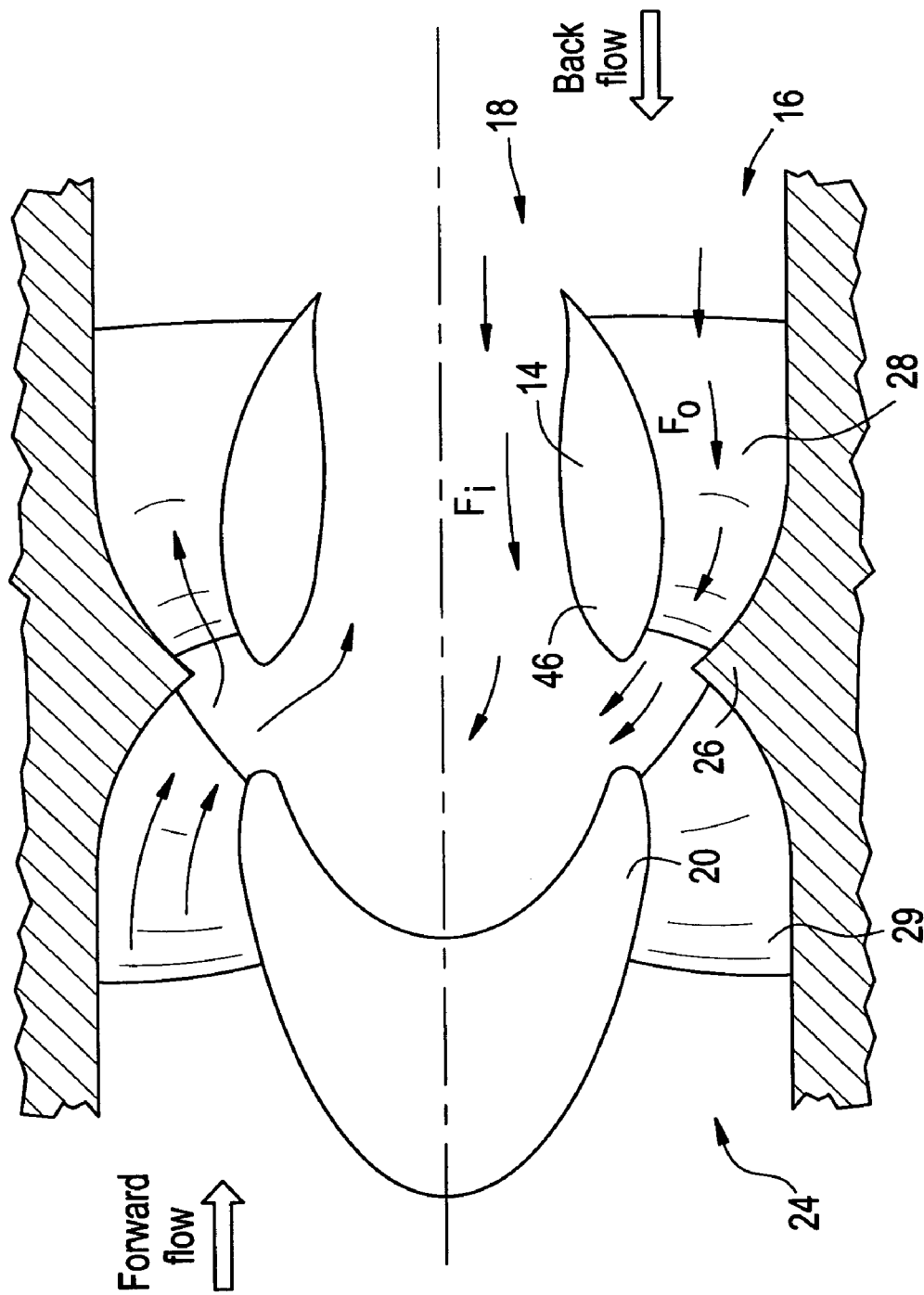
FIG. 2 is a diagrammatical representation of a naturally aspirated flow control device for redirecting strong pressure waves in accordance with an additional exemplary embodiment of the present invention.
Figure 3:
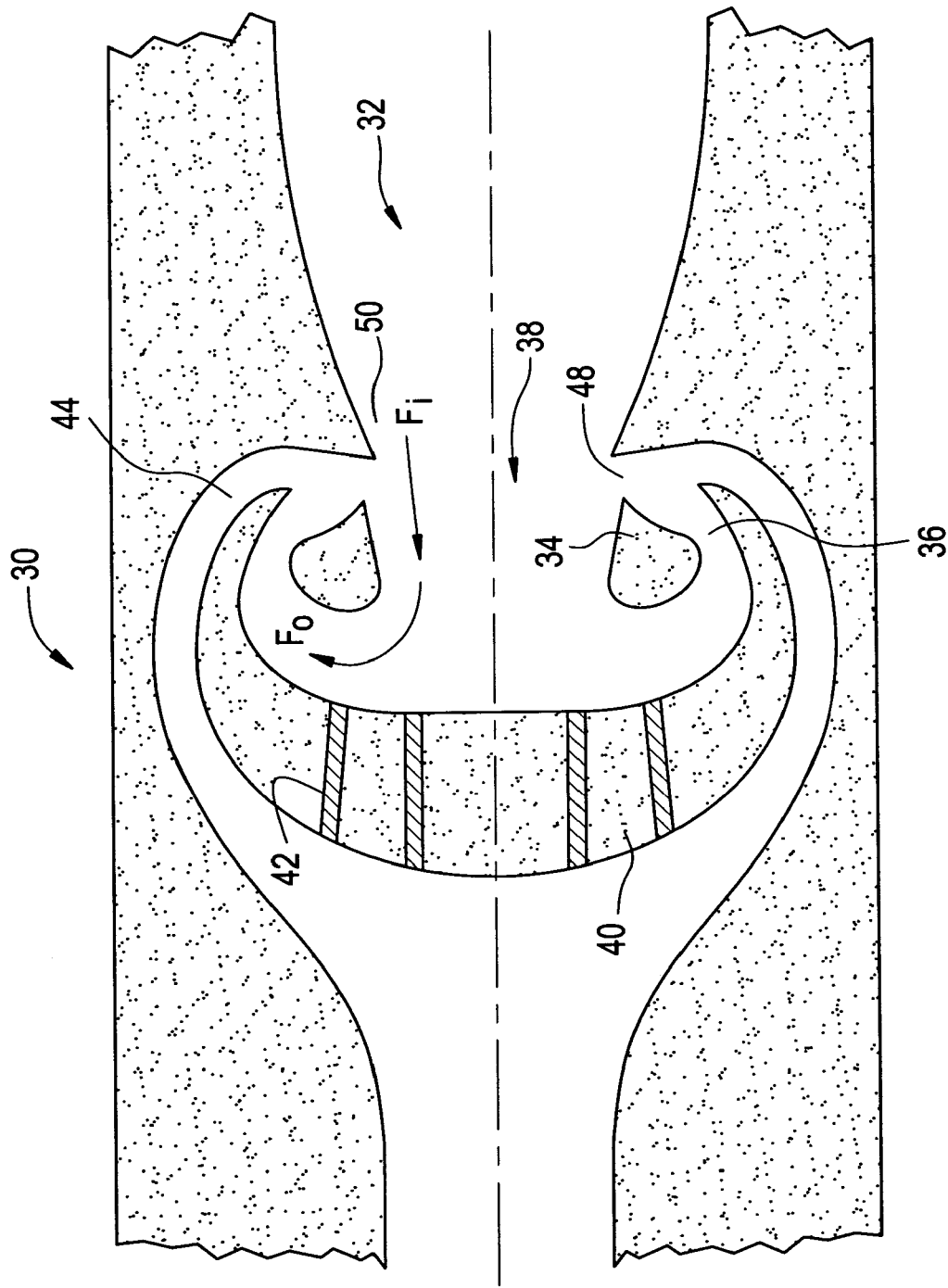
FIG. 3 is a diagrammatical representation of a naturally aspirated flow control device for redirecting strong pressure waves in accordance with an alternative exemplary embodiment of the present invention.

FIG. 1 is a cross-sectional side view of a portion of a pulse detonation device 10 including a fixed geometry flow separator 14, which divides a detonation chamber 12 of the device 10 into a primary region 18 and a control region 16. FIG. 2 is a cross-sectional side view of a portion of pulse detonation device 10, similar to the device 10 shown in FIG. 1, according to another embodiment of the invention. FIG. 3 is a cross-sectional side view of a portion of an alternative embodiment of pulse detonation device 30.

Turning now to FIG. 1, an exemplary embodiment of a pulse detonation device 10 is shown. Within the device 10 a fuel-air mixture is detonated in a detonation chamber 12, which is located downstream from both a fixed geometry flow separator 14 and an upstream chamber portion 20. As a result of the detonation, strong pressure waves and high-speed flows are generated which propagate both upstream and downstream. The pressure waves and flow propagating downstream eventually exit the device 10, thus producing thrust. The pressure waves and flow propagating upstream impact the flow separator 14, which directs portions of the pressure waves into the control region 16 and portions of the pressure waves into the primary region 18 of the chamber 12.

In a three-dimensional device 10, the flow separator 14 is formed as an annulus structure in the chamber 12, such that the outer control region 16 is formed in a radially outward position from the flow separator 14, while the inner primary region 18 is formed in a radially inward position from the separator 14. Further, the control region 16 is formed such that it converges in an upstream direction, whereas the primary region 18 diverges in an upstream direction.

Moreover, the separator 14 is passive such that it maintains a fixed geometry during detonation process. As such, there are no moving parts or components to complicate the structure. The separator 14 is acting to direct the flow with a fixed geometry configuration.

During operation, strong pressure waves impinge on the downstream edge of the flow separator 14, where the pressure waves are separated into the control flow Fo and primary flow Fi. Because the control region 16 is formed in a converging manner, as the control flow Fo moves upstream pressure behind the pressure waves increases. This increase in pressure causes the pressure waves and flow to accelerate through the control region 16. Further, because the primary region 18 diverges in an upstream direction, pressure behind the pressure waves in the primary flow Fi decreases, thus decelerating the pressure waves propagating in the primary region 18.

Because of the speed differential between the primary flow Fi and the control flow Fo, the pressure waves of the control flow Fo accelerate ahead of the corresponding pressure wave of the primary flow Fi. Then, because of the shape of a flow direction portion 26 and the upstream edge of the flow separator 14, the control flow Fo is directed toward a centerline CL of the device 10, thus creating a jet of flow from the control region 16 into the flow from the primary region 18.

The control flow Fo exits the control region 16 at an angle to the flow direction of the primary flow Fi. Because of this configuration, the control flow Fo creates a barrier to the primary flow Fi, in addition to mixing with the primary flow Fi, to reduce its strength, impede its progress upstream, and redirect the primary flow. Such a configuration impedes the backflow in the chamber 12, which prevents or impedes backflow into the secondary flow inlets 22 and primary flow inlets 25.

Fuel, air and/or a fuel/air mixture are injected into the chamber 12, through the flow inlets 22 and primary flow inlets 25, prior to detonation, from an upstream chamber 24. The structure and systems used to provide the flow through the flow inlets 22 and primary flow inlets 25 can be sensitive to high and frequent pressure rises, which are a side effect of upstream traveling pressure waves, which result from a detonation. The flow separator 14, of the present invention, acts to mitigate this backflow resulting in a reduction of the stress on these components and systems. Further, this is accomplished with no moving parts, but with the configuration of the control region 16, flow separator 14 and primary region 18.

Moreover, the configurations of the control region 16, primary region 18 and flow separator 14 are optimized so as to maximize downstream flow (minimize pressure loss), while minimizing the upstream flow (maximize pressure loss). Thus, this configuration acts as a flow diode. More specifically, since this device acts on pressure transients, the device is more likened to a flow induction coil. Stated differently, the device provides a transient diode effect to provide high impedance for backflow during a pressure pulse. However, the device may provide a lower level of impedance to backflow during lower pressure backflows. Thus, providing high impedance during high pressure pulses, while providing lower impedance during steady state back-flow conditions.

During refill, a mixture of air and fuel is injected into the chamber 12 via the primary flow inlets 25 and the secondary flow inlets 22. The flow inlets 22 are positioned in the upstream chamber portion 20 and are intended to provide additional cool air to purge the associated region of hot residual gases. However, in an additional embodiment, the flow inlets 22 are positioned in the flow direction portion 26. In a further embodiment, the flow inlets 22 are positioned in the flow separator 14. The present invention contemplates that the flow inlets 22 are distributed as required based on system and operational characteristics. For example, as shown in FIG. 1, the flow inlets 22 are positioned on both the upstream chamber portion 20 and the flow separator 14. The flow inlets 22 inject fuel, air or a fuel/air mixture, depending on the operational needs of device 10.

In a further alternative embodiment, the flow inlets 22 are positioned on the flow separator 14 and/or the flow direction portion 26 so as to flush out the control region 16 during the refill process. During operation, after the pressure wave and flow behind the pressure wave from the detonation passes through the control region 16, a secondary flow is directed into the control region 16 from the flow inlets 22 to flush the control region 16. In an additional embodiment, this flow is used to provide cooling for the flow separator 14, in addition to providing a flushing function.

In a further embodiment, a manifold structure (not shown) is provided in the flow separator 14 and/or the flow direction portion 26 to provide cooling of the components during operation.

FIG. 2 depicts a portion of another exemplary embodiment of a device 10 similar to that shown in FIG. 1. In this embodiment, the flow separator is secured in place with ribs 28. The ribs 28 are shaped such that they provide minimal flow blockage of the control flow Fo.

Additionally, as shown in FIG. 2, an additional embodiment of the present invention contains swirl vanes 29 positioned in the primary flow inlets 25. The swirl vanes 29 impart a swirl or rotation to the flow coming from the primary flow inlet 25. During the purge phase, where detonated gases are removed from the chamber 12, the swirl vanes 29 impart a tangential momentum on the flow entering from the primary flow inlets 25. Such momentum aids in turning the flow around the flow separator 14 and the resulting centrifugal forces help the flow expand past the divider 14 thus providing pressure recovery and a uniform flow. In a further embodiment, the rotation also aids in directing at least some of the flow back through the control region 16 to aid in purging this region before the next detonation. Further, in an additional embodiment, the swirl vanes 29 are configured and angled such that they provide additional shock wave reflection, to prevent or inhibit the pressure wave from entering the primary flow inlet 25.

In an additional embodiment, a flow separator lip portion 46 is positioned on the upstream edge of the flow separator 14. This lip portion 46 extends a sufficient amount to direct some of the flow from the primary flow inlet 25 back through the control region 16, so as to flush the control region 16 during a purge/refill process.

As indicated previously, the control region 16 directs the control flow Fo into the chamber 12 at an angle with respect to the primary flow Fi. The angle is optimized based on the desired operational characteristics of the device. In one embodiment, the control flow Fo enters the chamber at an angle less than 90 degrees to the angle of the primary flow Fi. In additional embodiments, the control flow Fo enters the chamber at an angle 90 degrees to the angle of the primary flow Fi, and more than 90 degrees to the angle of the primary flow Fi.

Additionally, the shape, size and orientation of the flow separator is optimized based on the operational parameters and design criteria of the device 10 in which it is used. Specifically, the flow separator 14 is optimized to provide a minimal pressure loss in the downstream direction, while providing a high impedance to upstream flows. This allows the separator 14 to act as a flow diode, which provides optimal flow in the downstream direction, during the purge and filling process, while inhibiting or preventing backflow after detonation. This characteristic aids in the creation of a stagnation region in the vicinity of the upstream chamber portion 20.

This stagnation region generates high pressure for the flow inlets 22 and 25, which aids in flushing the chamber 12 for the next detonation.

Additionally, in a further non-limiting embodiment the overall effective area ratios of the control region 16 to the primary region 18 is optimized to provide the desired flow diode effect, where the downstream flow and upstream flow impedance are optimized. In such a configuration, the effective stopping power of the control flow Fo is increased with an increase in shock magnitude. Stated differently, as the backflow magnitude increases, the magnitude of the control flow Fo increases, thus increasing the power of the flow exiting the control region 16, impeding and/or redirecting the primary flow Fi.

FIG. 3 depicts a further, non-limiting, exemplary embodiment of the present invention. In this embodiment, the pulse detonation device 30 is configured such that the exit of the primary flow inlet 44 and the exit to the control region 36 form a common channel 48 located in a downstream position from the flow separator 34. Additionally, as shown, the flow separator 34 is positioned such that a small portion, or none, of flow separator 34 is in the direct flow path of the primary flow Fi. In the embodiments shown in FIGS. 1 and 2, the flow separator 14 is positioned within the primary flow path to redirect some of the flow into the control region 16.

In the FIG. 3 embodiment, during the fill or purge phase, flow is from left to right as depicted in FIG. 3. In an annular configuration, swirl vanes, not shown, located in the control portions of the flow annulus impart tangential momentum to the flow. This induces a centrifugal force which allows the fill or purge gases to expand after the throat section 50, thus providing pressure recovery. During the forward flow phases, through the primary region 38, the control region 36 is largely bypassed, but a sufficient amount of flow does enter this region, thus purging any residual combustion gases.

In this embodiment, when a strong upstream pressure wave, traveling right to left in FIG. 3, reaches the throat location 50 the flow is slightly diverted away from the primary inlet 44. The pressure wave continues moving upstream where it contacts the upstream chamber portion 40, and at least a portion of the flow enters the control region 36. The pressure wave travels through the control region 36 and is redirected onto itself, thus reducing the intensity of the flow. The exit of the primary flow inlet 44 is shaped so as to impede any upstream flow entering that region while allowing forward flow to progress unimpeded.

As the control flow Fo flows through the control region 36 it is directed back into the primary flow Fi, to impede the upstream flow of the primary flow Fi. Although this embodiment shows the upstream chamber portion 40 having a planar surface, the present invention is not limited to this embodiment. For example, the portion 40 may also be shaped with two converging shapes. The shape of the upstream chamber portion 40 is optimized to provide maximum flow impedance in the upstream direction, while providing little flow resistance in the downstream direction during purge and refill.

Further, in an alternative embodiment a flow of air, fuel or a fuel/air mixture is supplied via the primary flow inlet 44 such that the control flow Fo is prevented from entering the primary flow inlet 44. Further, as the control flow Fo passes beyond the primary flow inlet 44, the flow from this inlet begins to enter the common channel 48 and begin the purge and refill process.

In yet an additional embodiment (not depicted), a single flow deflector 14 and upstream chamber portion 20 is coupled to a plurality of detonation chambers 12. In this embodiment, portions of the shock waves from the chambers 12 pass through the control region 16, while remaining portions pass through the primary region. In an alternative configuration, the entire shock wave and flow from one, or more, of the chambers 12 is directed into the control region 16, such that the entire backflow from these chamber(s) 12 is used as the control flow Fo, whereas the entire flow from the remaining chambers 12 passes through the primary region 18. In this configuration a manifold structure is used to direct the respective flows as required.

While the invention has been described in terms of various specific embodiments, those skilled in the art will recognize that the invention can be practiced with modification within the spirit and scope of the claims.

What is claimed is:

1. A pulse detonation device, comprising:
    at least one detonation chamber having a central axis in which a mixture of fuel and air is combusted which creates a flow of combusted gas; and
    a fixed geometry flow separator formed as an annulus which inhibits backflow of said combusted gas into an inlet region of said chamber,
    wherein said geometry is fixed during said combustion of said mixture, and
    further wherein the fixed geometry flow separator separates said backflow into an annular control region converging in backflow located radially outwardly from the fixed geometry flow separator and a primary region diverging backflow located within the annulus of the fixed geometry flow separator, such that said control region converging backflow mixes with and impedes said primary region diverging backflow upstream of the fixed geometry flow separator to substantially prevent any shockwave produced via said combustion from propagating upstream toward an inlet region of said chamber wherein said control region converging backflow has a higher flow velocity that said primary region diverging backflow.

2. The pulse detonation device of claim 1, wherein said control region directs said control flow into said primary flow at an angle to a direction of flow of said primary flow.

3. The pulse detonation device of claim 2, wherein a cross-sectional area of said control region decreases from a downstream end to an upstream end.

4. The pulse detonation device of claim 2, wherein a cross-sectional area of said primary region increases or remains constant from a downstream end to an upstream end.

5. The pulse detonation device of claim 2, wherein said control region directs said control flow into said primary flow at an angle less than 90 degrees to said direction of flow of said primary flow.

6. The pulse detonation device of claim 2, wherein said control region directs said control flow into said primary flow at an angle 90 degrees to said direction of flow of said primary flow.

7. The pulse detonation device of claim 2, wherein said control region directs said control flow into said primary flow at an angle greater than 90 degrees to said direction of flow of said primary flow.

8. The pulse detonation device of claim 2, wherein said primary flow is directed towards an upstream chamber portion, positioned upstream from said flow separator.

9. The pulse detonation device of claim 8, wherein said upstream chamber portion comprises a plurality of flow inlets through which one of a fuel, air and fuel/air mixture enters said chamber.

10. The pulse detonation device of claim 1, wherein said chamber comprises at least one primary flow inlet through which one of a fuel, air and fuel/air mixture enters said chamber.

11. The pulse detonation device of claim 1, wherein a plurality of ribs secure said flow separator to a flow direction portion of said chamber.

12. The pulse detonation device of claim 10, wherein a plurality of swirl vanes are located in said at least one primary flow inlet, wherein said swirl vanes impart a tangential momentum on said one of a fuel, air and fuel/air mixture.

13. The pulse detonation device of claim 10, wherein an exit portion of said at least one primary flow inlet is coupled to an inlet portion of said control region so as to form a common channel which is coupled to said chamber at a position downstream from said flow separator.

14. The pulse detonation device of claim 1, wherein an entire portion of said flow separator is within said chamber.

15. The pulse detonation device of claim 8, wherein said control flow is directed by said control region and said upstream chamber portion to intersect with said primary flow, at an angle to said primary flow.

16. The pulse detonation device of claim 10, wherein said flow separator comprises a leading edge lip portion which extends beyond an opening of said at least one primary flow inlet to direct at least some of said one of said fuel, air and fuel/air mixture through said control region in a direction opposite said control flow.

17. The pulse detonation device of claim 1, wherein said flow separator is formed as an annulus positioned radially with respect to a centerline of said chamber.

18. The pulse detonation device of claim 1, wherein said device comprises a plurality of said detonation chambers.

19. A pulse detonation device, comprising:
at least one detonation chamber having a central axis in which a mixture of fuel and air is combusted which creates a flow of combusted gas; and
a flow separator formed as an annulus which separates any backflow caused by said combustion into a converging control flow and a diverging primary flow, such that said converging control flow enters a control region of said chamber formed as annulus located radially outwardly from the flow separator and said diverging primary flow enters a primary region located within the annulus of the flow separator of said chamber; and
wherein said control region directs said converging control flow into said diverging primary flow at an angle to a direction of flow of said diverging primary flow wherein said control region converging control flow has a higher flow velocity that said diverging primary flow to impede upstream propagation of any shockwave produced via said combustion.

20. The pulse detonation device of claim 19, wherein said flow separator is a fixed geometry flow separator.

21. The pulse detonation device of claim 19, wherein said control region directs said control flow into said primary flow at an angle less than 90 degrees to said direction of flow of said primary flow.

22. The pulse detonation device of claim 19, wherein said control region directs said control flow into said primary flow at an angle 90 degrees to said direction of flow of said primary flow.

23. The pulse detonation device of claim 19, wherein said control region directs said control flow into said primary flow at an angle greater than 90 degrees to said direction of flow of said primary flow.

24. The pulse detonation device of claim 19, wherein said primary flow is directed towards an upstream chamber portion, positioned upstream from said flow separator.

25. The pulse detonation device of claim 24, wherein said upstream chamber portion comprises a plurality of flow inlets through which one of a fuel, air and fuel/air mixture enters said chamber.

26. The pulse detonation device of claim 19, wherein said chamber comprises at least one primary flow inlet through which one of a fuel, air and fuel/air mixture enters said chamber.

27. The pulse detonation device of claim 19, wherein a plurality of ribs secure said flow separator to a flow direction portion of said chamber.

28. The pulse detonation device of claim 26, wherein a plurality of swirl vanes are located in said at least one primary flow inlet, wherein said swirl vanes impart a tangential momentum on said one of a fuel, air and fuel/air mixture.

29. The pulse detonation device of claim 19, wherein an entire portion of said flow separator is within said chamber.

30. The pulse detonation device of claim 19, wherein said flow separator comprises a plurality of flow inlets through which one of a fuel, air and fuel/air mixture enters said chamber.

31. The pulse detonation device of claim 24, wherein said control flow is directed by said control region and said upstream chamber portion to intersect with said primary flow, at an angle to said primary flow.

32. The pulse detonation device of claim 26, wherein said flow separator comprises a leading edge lip portion which extends beyond an opening of said at least one primary flow inlet to direct at least some of said one of said fuel, air and fuel/air mixture through said control region in a direction opposite said control flow.

33. The pulse detonation device of claim 19, wherein said flow separator is formed as an annulus positioned radially with respect to a centerline of said chamber.

34. The pulse detonation device of claim 19, wherein said device comprises a plurality of said detonation chambers.

35. The pulse detonation device of claim 19, wherein a cross-sectional area of said control region decreases from a downstream end to an upstream end.

36. The pulse detonation device of claim 19, wherein a cross-sectional area of said primary region remains constant from a downstream end to an upstream end.

* * * * *

UNITED STATES PATENT AND TRADEMARK OFFICE
CERTIFICATE OF CORRECTION

| | | |
|---|---|---|
| PATENT NO. | : 7,828,546 B2 | Page 1 of 1 |
| APPLICATION NO. | : 11/172304 | |
| DATED | : November 9, 2010 | |
| INVENTOR(S) | : Wiedenhoefer et al. | |

It is certified that error appears in the above-identified patent and that said Letters Patent is hereby corrected as shown below:

On the Face Page, in Figure, delete " ₵ " and insert -- CL --, therefor.

In Fig. 1, Sheet 1 of 3, delete " ₵ " and insert -- CL --, therefor.

In Column 6, Line 27, in Claim 1, delete "in" before "backflow".

In Column 7, Lines 41-43, in Claim 19, delete "of said chamber formed as annulus located radially outwardly from the flow separator" and insert -- formed as annulus located radially outwardly from the flow separator of said chamber --, therefor.

In Column 7, Lines 48-50, in Claim 19, after "primary flow", delete "wherein said control region converging control flow has a higher flow velocity that said diverging primary flow" and insert -- upstream of the flow separator --, therefor.

In Column 7, Line 52, in Claim 19, delete "said combustion." and insert -- , wherein said control region converging control flow has a higher flow velocity that said diverging primary flow. --, therefor.

Signed and Sealed this
Sixteenth Day of August, 2011

David J. Kappos
*Director of the United States Patent and Trademark Office*